United States Patent
Varma et al.

(10) Patent No.: US 12,541,789 B2
(45) Date of Patent: Feb. 3, 2026

(54) STRUCTURING A MULTI-SEGMENT OPERATION

(71) Applicant: Bank of America Corporation, Charlotte, NC (US)

(72) Inventors: Jayachandra Varma, Irving, TX (US); Adithya Gadwale, Falls Church, VA (US); Ganesh Bonda, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 1014 days.

(21) Appl. No.: 17/584,835

(22) Filed: Jan. 26, 2022

(65) Prior Publication Data

US 2023/0237572 A1    Jul. 27, 2023

(51) Int. Cl.
  *G06Q 40/03*        (2023.01)
(52) U.S. Cl.
  CPC .................... *G06Q 40/03* (2023.01)
(58) Field of Classification Search
  CPC ......... G06Q 40/03; G06Q 10/10; G06N 20/00
  See application file for complete search history.

(56) References Cited

U.S. PATENT DOCUMENTS

| | | |
|---|---|---|
| 2008/0120211 A1 | 5/2008 | Oppenheimer et al. |
| 2010/0076994 A1 | 3/2010 | Soroca et al. |
| 2010/0124986 A1 | 5/2010 | Van Luchene |
| 2011/0112955 A1 | 5/2011 | Nolan, III et al. |
| 2011/0310100 A1* | 12/2011 | Adimatyam ............ G06F 3/017 |
| | | 382/103 |
| 2012/0209705 A1 | 8/2012 | Ramer et al. |
| 2013/0055097 A1 | 2/2013 | Soroca et al. |
| 2013/0097664 A1 | 4/2013 | Herz et al. |
| 2013/0290143 A1 | 10/2013 | Lampl et al. |
| 2013/0297477 A1 | 11/2013 | Overman et al. |
| 2013/0304581 A1 | 11/2013 | Soroca et al. |
| 2014/0067650 A1 | 3/2014 | Gardiner et al. |
| 2014/0114981 A1* | 4/2014 | Lindberg ............. G06F 16/313 |
| | | 707/748 |
| 2014/0222637 A1 | 8/2014 | Giles |
| 2017/0188072 A1* | 6/2017 | Major ................ H04N 21/2187 |
| 2018/0165598 A1 | 6/2018 | Saxena et al. |
| 2018/0165758 A1 | 6/2018 | Saxena et al. |
| 2019/0180358 A1 | 6/2019 | Nandan et al. |
| 2021/0056635 A1 | 2/2021 | Rogerson et al. |
| 2021/0224922 A1 | 7/2021 | Juban et al. |

\* cited by examiner

*Primary Examiner* — Hao Fu

(57) ABSTRACT

A system comprises a processor configured to receive user criteria associated with an operation and to obtain a plurality of segment candidates from a plurality of sources, each source configured to provide a segment of the operation that corresponds to a respective segment candidate obtained from said source. The processor is configured to determine a plurality of operation structure candidates for the operation. Each operation structure candidate is determined based on aggregating a respective subset of the plurality of segment candidates. The processor is configured to determine a priority for each operation structure candidate based on prioritization rules stored in memory of the system and based on the user criteria. The processor is configured to communicate an output indicating one or more of the operation structure candidates for the operation. The output is based on the priority.

20 Claims, 3 Drawing Sheets

STRUCTURING A MULTI-SEGMENT OPERATION

TECHNICAL FIELD

The present disclosure relates generally to structuring a multi-segment operation.

BACKGROUND

In general, a user may interact with a user device to request an operation. For example, a user may enter a request for the operation via an interface of the user device. The user device may communicate the request to a computer system via a network. The computer system may be configured to provide the requested operation.

SUMMARY

The system described in the present disclosure is particularly integrated into practical applications of improving network routing efficiency and reducing network congestion. This, in turn, provides an additional practical application of improving network bandwidth allocation efficiency and utilization. As such, the technology disclosed in the present disclosure improves the underlying operations of network nodes, servers, switches, and routers that communicate data among devices. The system described in the present disclosure is particularly integrated into practical applications of improving processing efficiency and reducing processing load of computing systems. This, in turn, provides an additional practical application of improving processing resource allocation efficiency and utilization. As such, the technology disclosed in the present disclosure improves the underlying operations of services, devices, and other computing systems. These practical applications are also described below.

The present disclosure contemplates systems and methods configured to structure multi-segment operations. In a multi-segment operation, an operation may be executed in multiple segments. Different sources may provide different segments of the operation. Embodiments of the present disclosure facilitate obtaining segment candidates from a plurality of sources and determining operation structure candidates based on the segment candidates. An operation structure candidate indicates an option available for structuring the data processing transaction. Different options for structuring the data processing transaction may be based on aggregating different combinations of segment candidates. Certain embodiments determine a priority associated with each operation structure candidate and output one or more of the operation structure candidates based on priority.

The systems and methods described improve network routing efficiency and processing efficiency, thereby reducing network congestion and processing load. For example, the disclosed systems and methods need not consume network bandwidth and processing capacity that would otherwise be required for each user to send individual requests to obtain segment candidates from each source, receive individual responses from each source, and present the segment candidates to the user. Rather, the disclosed systems and methods allow a user to send a server a request for an operation and receive a response comprising one or more operation structure candidates.

To further improve efficiency, in certain embodiments, the server may obtain segment candidates from the sources and maintain the segment candidates in memory associated with the server. The server may use the stored segment candidates when responding to a number of requests from a number of users, thereby reducing network traffic that would otherwise be required for the server to obtain the same segment candidates from the sources for each request and/or network traffic that would otherwise be required for the sources to send copies of the same segment candidates to all of the users.

To further improve efficiency, in certain embodiments, the server may limit the number of operation structure candidates communicated to the user. For example, the server may be configured to send the N highest priority operation structure candidates in response to a user request, thereby reducing network traffic that would otherwise be required to send all of the operation structure candidates to the user. Moreover, communicating operation structure candidates to the user (rather than communicating all of the individual segment candidates to the user) may improve efficiency because the system need not consume network bandwidth on communicating segment candidates that would not work in the overall structure for the data processing transaction.

Certain embodiments of the systems and methods determine the operation structure candidates based on dependencies among the segment candidates. A dependency indicates that an attribute of one of the segment candidates impacts an attribute of another of the segment candidates. The systems and methods may filter or prioritize the operation structure candidates depending on whether the impact of a dependency is positive/favorable, neutral, or negative/unfavorable. The systems and methods need not send the user the operation structure candidates for which the particular combination of segment candidates would have an overall negative impact on the operation. This improves network routing efficiency and processing efficiency, thereby reducing network congestion and processing load, because the systems and methods need not consume network bandwidth or processing capacity that would otherwise be consumed if such operation structure candidates were sent to the user.

Accordingly, the disclosed system may be integrated into a practical application of improving network bandwidth allocation efficiency and utilization.

Furthermore, fewer network resources and data packets may be needed to conduct the multi-segment operation. Accordingly, the disclosed system may be integrated into a practical application of improving network resource utilization.

As such, the disclosed system improves the underlying operations of network nodes, servers, switches, and routers that communicate data among computer systems from which the user, server, and/or sources communicate with each other.

According to certain embodiments, a system for structuring operations comprises a memory and a processor operably coupled to the memory. The memory is configured to store prioritization rules. The prioritization rules facilitate structuring the operations. The processor is configured to receive user criteria associated with a requested operation and to obtain a plurality of segment candidates from a plurality of sources. Each source is configured to provide a segment of the requested operation that corresponds to a respective segment candidate obtained from said source. The processor is configured to determine a plurality of operation structure candidates for the requested operation. Each operation structure candidate is determined based on aggregating a respective subset of the plurality of segment candidates. The processor is configured to determine, for each operation structure candidate, a priority associated with said operation structure candidate. The priority is determined based at least in part on the user criteria and the prioritization rules. The processor is configured to communicate an output indicating one or more of the operation structure candidates for the requested operation. The output is based on the priority.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to structure multi-segment operations. This disclosure provides various systems and methods to structure multi-segment operations. Embodiments of the present disclosure and its advantages may be understood by referring to FIG. 1 through FIG. 3, which describe a system and methods for structuring multi-segment operations.

Example System for Structuring Multi-Segment Operations

Figure 1:
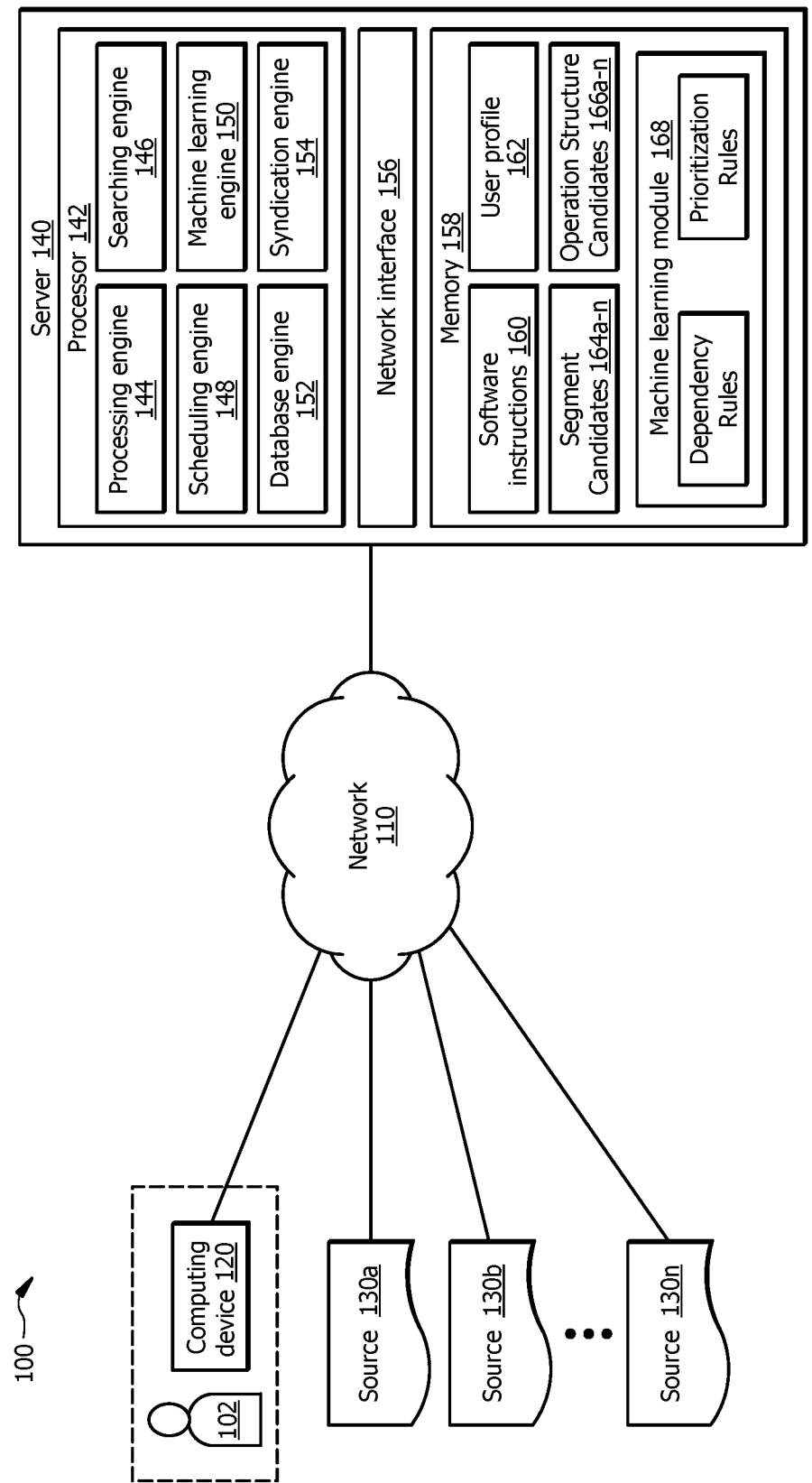
FIG. 1 illustrates an embodiment of a system configured to structure multi-segment operations.

FIG. 1 illustrates one embodiment of a system 100 that is configured to structure multi-segment operations. In one embodiment, the system 100 comprises a server 140 communicatively coupled with a computing device 120 and one or more sources 130a-n via a network 110. Network 110 enables the communication between components of the system 100. Server 140 comprises a processor 142 in signal communication with a memory 158. Memory 158 stores software instructions 150 that when executed by the processor 142, cause the processor 142 to perform one or more functions described herein. For example, when the software instructions 150 are executed, the processor 142 executes the processing engine 144 to receive user criteria associated with an operation that has been requested by a user 102 via computing device 120, obtain segment candidates 164 from sources 130 that are configured to provide segments of the requested operation, determine operation structure candidates 166 for the requested operation based on aggregating various subsets of segment candidates 164, determine a priority associated with each operation structure candidate 166, and communicate an output indicating one or more of the operation structure candidates 166 for the requested operation, wherein the output is based on the priority. In other embodiments, system 100 may not have all of the components listed and/or may have other elements instead of, or in addition to, those listed above.

In general, the system 100 improves multi-segment operations. In an example scenario, assume that the user 102 wants to perform an operation comprising multiple segments. The operation may be based on user criteria indicated by the user 102 via computing device 120. System 100 may include numerous segment candidates 164. Each segment candidate 164 may be available for the user 102 to select as segment of the operation. However, it may be challenging for the user 102 to compare the various segment candidates 164 and to determine which combination of segment candidates 164 to select to fulfill the overall operation. To facilitate the operation, certain embodiments of server 140 determine a plurality of operation structure candidates 166. Each operation structure candidate 166 may be available for the user 102 to select as a way of structuring the multi-segment operation. Each operation structure candidate 166 is determined based on aggregating a respective subset of the plurality of segment candidates 164. As an example, a first operation structure candidate 166a may structure the multi-segment operation to include a first subset of segment candidates 164, such as a first segment candidate 164a and a second segment candidate 164b. A second operation structure candidate 166b may structure the multi-segment operation to include a second subset of segment candidates 164, such as the first segment candidate 164a and a third segment candidate 164c. In certain embodiments, server 140 is configured to determine a priority associated with each operation structure candidate 166. For example, server 140 may determine a first priority associated with the first operation structure candidate 166a and a second priority associated with the second operation structure candidate 166b. Priority may be based on which of the operation structure candidates 166 best meets the user criteria associated with the requested operation and/or prioritization rules used by server 140. Server 140 may communicate an output to the user 102 via computing device 120. As an example, the output may indicate one of the operation structure candidates 166 that server 140 recommends to user 102 based on priority.

In certain embodiments, server 140 determines the operation structure candidates 166 based at least in part on the one or more dependencies among the plurality of segment candidates 164. Each dependency indicates that an attribute of one of the segment candidates 164 impacts an attribute of another of the segment candidates 164. Server 140 may determine the dependencies and use the dependencies to determine whether to include certain segment candidates 164 in the same subset of segment candidates 164 (e.g., whether certain segment candidates 164 can be part of the same operation structure candidate 166). For example, server 140 may determine that segment candidates 164 with beneficial dependencies and/or neutral dependencies can be included in the same subset associated with a particular operation structure candidate 166. Server 140 may determine that segment candidates with detrimental dependencies cannot be included in the same subset/cannot be part of the same operation structure candidate 166. Similarly, in certain embodiments, server 140 may be configured to avoid aggregating any of the segment candidates 164 for which one or more dependency rules indicate said segment candidates 164 cannot be aggregated. Thus, when determining the operation structure candidates 166, server 140 would avoid selecting segment candidates 164 that are prohibited from being aggregated together in the same operation. In this manner, server 140 can indicate to the user an optimal approach to structuring the multi-segment operation.

System Components

Network

Network 110 may be any suitable type of wireless and/or wired network, including, but not limited to, all or a portion of an Internet, an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network. The network 110 may be configured to support any suitable type of communication protocol as would be appreciated by one of ordinary skill in the art.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The computing device 120 is configured to communicate with other devices via the network 110. For example, the computing device 120 may communicate with server 140 and/or a source 130.

Source

In one embodiment, source 130 may comprise a device, such as a personal computer, a desktop computer, a workstation, a server, a laptop, a tablet computer, a mobile phone, and so on. Source 130 may be configured to provide one or more segments of a multi-segment operation. As an example, in an embodiment, a first source 130a may provide a first segment of the operation and a second source 130b may provide a second segment of the operation. Source 130 may further be configured to indicate to server 140 one or more segment candidates 164 that source 130 is available to provide. In certain embodiments, source 130 may be configured to indicate to server 140 information that server 140 uses in determining any dependencies associated with the segment candidates 164.

In certain embodiments, server 140 may be one of the sources 130 or server 140 may be associated with the same entity (such as an organization) as one or more of the sources 130. As an example, server 140 may be associated with an organization and sources 130 may comprise various lines-of-business of the organization. Thus, the organization may be able to provide one or more segments of the operation via server 140 and/or other sources 130 associated with the organization. In addition, or in the alternative, one or more segments of the operation may be provided by one or more sources 130 that are not part of the same organization.

Server

Server 140 is generally a device that is configured to process data and communicate with computing devices (e.g., computing devices 120), sources 130, databases, systems, etc., via the network 110. In certain embodiments, the server 140 may be associated with an organization. In certain embodiments, server 140 comprises processor 142, network interface 156, and memory 158. Server 140 is generally configured to oversee the operations of processor 142, which may be configured to perform method 200 described in FIG. 2 and/or method 300 described in FIG. 3. Processor 142 comprises one or more processors operably coupled to the memory 158.

The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors 142 may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement processing engine 144, searching engine 146, scheduling engine 148, machine learning engine 150, database engine 152, and/or syndication engine 154. In this way, processor 142 may be a special-purpose computer designed to implement the functions disclosed herein. In an embodiment, the processor 142 is implemented using logic units, FPGAs, ASICs, DSPs, or any other suitable hardware.

Network interface 156 is configured to enable wired and/or wireless communications. The network interface 156 may be configured to communicate data between other devices, systems, or domains. For example, the network interface 156 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 156. The network interface 156 may be configured to use any suitable type of communication protocol as would be appreciated by one of ordinary skill in the art.

The memory 158 may be volatile or non-volatile and may comprise read-only memory (ROM), random-access memory (RAM), ternary content-addressable memory (TCAM), dynamic random-access memory (DRAM), and static random-access memory (SRAM). The memory 158 may include one or more of a local database, cloud database, network-attached storage (NAS), etc. The memory 158 comprises one or more disks, tape drives, or solid-state drives, and may be used as an over-flow data storage device, to store programs when such programs are selected for execution, and to store instructions and data that are read during program execution. The memory 158 may store any of the information described in FIGS. 1-3 along with any other data, instructions, logic, rules, or code operable to implement the function(s) described herein when executed by processor 142. For example, the memory 158 may store software instructions 160, user profile 162, segment candidates 164a-n, operation structure candidates 166a-n, machine learning module 168 (which may comprise dependency rules and/or prioritization rules), and/or any other data or instructions. The software instructions 160 may comprise any suitable set of instructions, logic, rules, or code operable to execute the processor 142 and perform the functions described herein, such as some or all of those described in FIGS. 1-3.

Processor Engines

In the example shown in FIG. 1, processor 142 comprises a plurality of engines. The engines include processing engine 144, searching engine 146, scheduling engine 148, machine learning engine 150, database engine 152, and syndication engine 154. Modifications, additions, or omissions may be made to processor 142. Processor 142 may include more, fewer, or other engines. Engines may be integrated or separated in any suitable manner. In certain embodiments, one or more of the engines may interact with memory 158, for example, in order to read and/or write data, instructions, logic, rules, or code associated with software instructions 160, user profile 162, segment candidates 164a-n, operation structure candidates 166a-n, and/or machine learning module 168. Modifications, additions, or omissions may be made to memory 158. Memory 158 may include more, fewer, or other information. The information may be stored in any suitable manner.

In general, processing engine 144 facilitates processing performed by processor 142. Processing may include obtaining inputs, executing logic, communicating outputs, and so on. In certain embodiments, processing engine facilitates communicating inputs and outputs among any of searching engine 146, scheduling engine 148, machine learning engine 150, database engine 152, syndication engine 154, network interface 156, and/or memory 158. In certain embodiments, processing engine 144 may manage one or more of the other engines of processor 142. For example, processing engine 144 may communicate instructions to another engine instructing the engine to perform its function(s).

Searching engine 146 may be configured to search for segment candidates 164 and to store segment candidates 164 in memory 158. In certain embodiments, searching engine 146 searches for segment candidates 164 according to a schedule. Scheduling engine 148 may determine the schedule used by searching engine 146. For example, scheduling engine 148 may periodically instruct searching engine 146 to update the segment candidates 164. Scheduling engine 148 may determine the schedule according to a recurring time period (such as daily, weekly, monthly, or other suitable time period) or in response to events (such as requests from the user 102). In certain embodiments, scheduling engine 148 maintains multiple schedules. As an example, scheduling engine 148 may schedule to search a first source 130a weekly and to search a second source 130b monthly. Searching engine 146 may search for segment candidates 164, for example, by sending requests to one or more sources 130 and/or by searching any suitable website, social media site, database, etc. Updating the segment candidates 164 based on the results of the search may include adding new segment candidates 164, modifying existing segment candidates 164, and/or deleting obsolete segment candidates 164 from memory 158. In certain embodiments, database engine 152 facilitates storing segment candidates 164 in memory 158 and retrieving segment candidates 164 from memory 158.

Machine learning engine 150 may facilitate training machine learning module 168 and/or applying rules (e.g., dependency rules or prioritization rules) determined by machine learning module 168. In certain embodiments, the machine learning module 168 may be implemented by supervised machine learning, semi-supervised machine learning, and/or unsupervised machine learning algorithm. For example, the machine learning module 168 may comprise a support vector machine, neural network, random forest, k-means clustering, etc. In another example, the machine learning module 168 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In certain embodiments, the machine learning module 168 may include video signal processing, speech signal processing, and/or text processing (e.g., natural language processing).

In certain embodiments, the processing engine 144 and/or the machine learning engine 150 may feed information to the machine learning module 168. The machine learning module 168 may extract features from the received information and may determine key phrases or keywords associated with the features. For example, the machine learning module 168 may use part-of-speech tagging, words sequences, word tokenization, sentence tokenization, word segmentation, sentence segmentation, sentiment analysis, and/or any other linguistic pattern analysis to identify the key phrases. The key phrases may be identified based on a length of a key phrase, a frequency of occurrence of a key phrase, a number of characters in a key phrase, a position of a key phrase in a sentence, the meaning of the key phrase, and/or other criteria.

In certain embodiments, the machine learning module 168 may be trained to detect patterns associated with operations and use those patterns to generate and/or update one or more dependency rules or prioritization rules. A dependency rule may indicate whether or not certain segment candidates 164 can be aggregated for use in the same operation structure candidate 166 and/or an impact that one segment candidate 164a has another segment candidate 164b when used in the same operation structure candidate 166. As an example, a dependency rule may be determined based on detecting patterns associated with the results of previously using or attempting to use certain combinations of segment candidates 164 in the same operation or operation structure candidate 166.

A prioritization rule may indicate how to prioritize the operation structure candidates 166. As an example, machine learning module 168 may observe a plurality of requests for operations. Machine learning module 168 may group the requests such that operations associated with similar user criteria are grouped together. Certain embodiments may determine user criteria to be similar, for example, if the user criteria includes certain attributes in common or certain attributes having values within some margin of each other. As an example, a first user criteria specifying a first value for a first attribute may be determined to be similar to a second user criteria specifying a second value for the first attribute if the first value is within some margin of the second value (such as plus-or-minus 5%, 10%, or other suitable margin). Machine learning module 168 may further observe a plurality of operation structure candidates 166 offered to each user 102 in response to each request in the group of requests. Machine learning module 168 may further observe which operation structure candidate 166 each user 102 selected from among the options offered. Machine learning module 168 may determine patterns based on attributes of the operation structure candidates 166 that the users 102 selected and may use the pattern to add, modify, or delete prioritization rules. For example, if machine learning module 168 determines a pattern where users 102 are more likely to select a first type of operation structure candidate 166a than a second type of operation structure candidate 166b, machine learning module 168 may provide a prioritization rule to prioritize the first type of operation structure candidate 166a.

Machine learning engine 150 may facilitate responding to a user 102's request for an operation. As described above, machine learning engine 150 may apply rules (e.g., dependency rules or prioritization rules) determined by machine learning module 168. As an example, machine learning engine 150 may apply the dependency rules in order to select, add, modify, or delete operation structure candidates 166 associated with memory 158. In certain embodiments, machine learning engine 150 interacts with database engine 152 to obtain a plurality of segment candidates 164 from memory 158. For example, machine learning engine 150 may request database engine 152 to retrieve segment candidates 164 having certain attributes or certain attribute values (e.g., the value of attribute X is within a particular range). In certain embodiments, machine learning engine 150 determines the attributes for database engine 152 to search within memory 158 based at least in part on a user profile 152. As an example, user profile 152 may include user criteria obtained from a request for an operation received from the user 102. As another example, user profile 152 may include other information associated with the user. For example, suppose that the requested operation is to facilitate a loan. User profile 152 may include user criteria (such as the amount of money being sought by the user and the user's preferred terms for the loan, such as interest rate, loan duration, etc.). User profile 152 may further include other user information (such as assets, income, credit score, or other financial information associated with the user) that facilitates determining which loans the user may qualify for. Machine learning module 150 applies the dependency rules to determine which segment candidates 164 can be aggregated and/or which segment candidates 164 interact synergistically when aggregated. Based on this determination, machine learning module 150 may select, add, or modify operation structure candidates 166 for the requested operation. Machine learning module 150 applies the prioritization rules to prioritize the operation structure candidates 166. Machine learning module 150 may output one or more operation structure candidates 166 for presentation to the user 102 based on the priority of the operation structure candidates 166.

In certain embodiments, processor 142 may be further configured to facilitate an operation. For example, the user 102 may select an operation structure candidate 166, and processor 142's syndication engine 154 may facilitate an operation structured based on the operation structure candidate 166. In an embodiment, the selected operation structure candidate 166 includes a first segment candidate 164a obtained from a first source 130a and a second segment candidate 164b obtained from a second source 130b. Syndication engine 154 communicates with first source 130a to provide the first segment of the operation and second source 130b to provide the second segment of the operation.

Example Method for Structuring a Multi-Segment Operation

Figure 2:
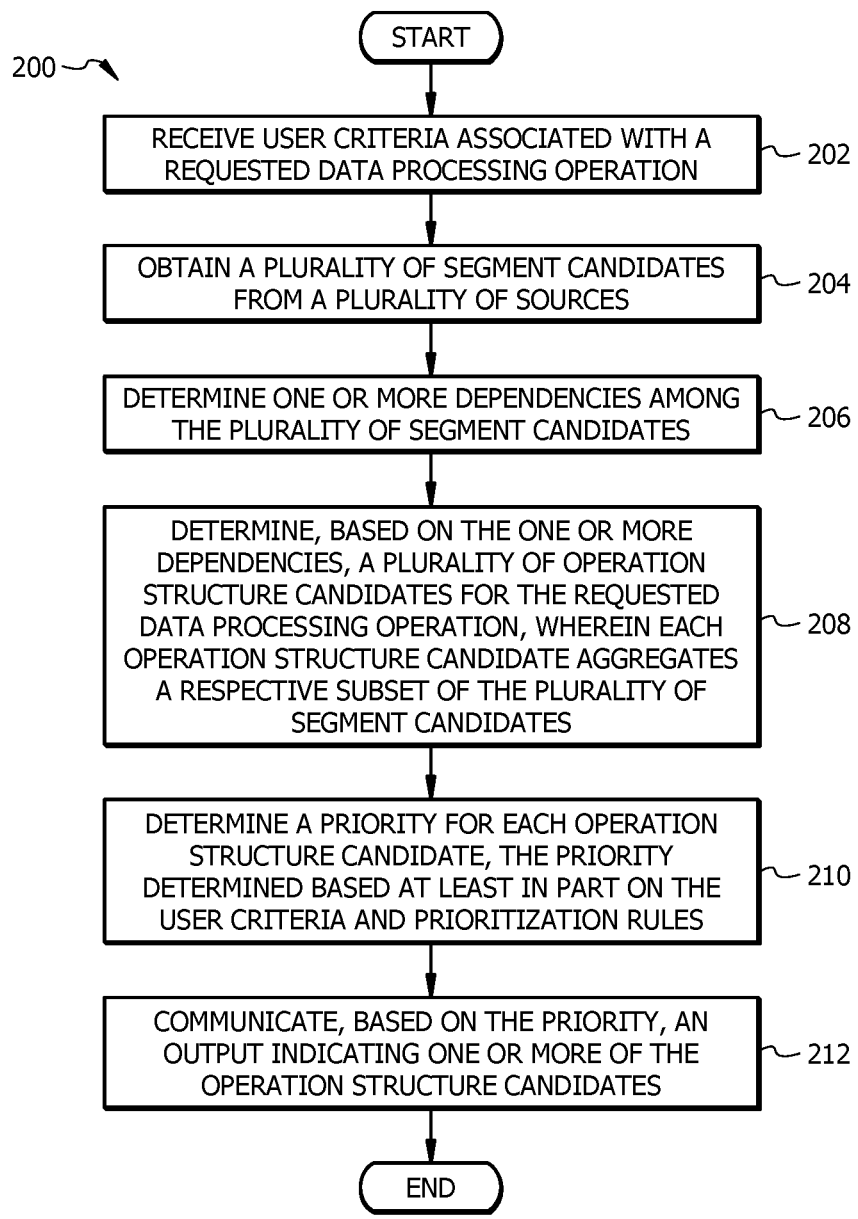
FIG. 2 illustrates an example flowchart of a method for structuring multi-segment operations.

FIG. 2 illustrates an example flowchart of a method 200 for structuring a multi-segment operation. Modifications, additions, or omissions may be made to method 200. Method 200 may include more, fewer, or other steps. For example, steps may be performed in parallel or in any suitable order. In certain embodiments, system 100, server 140, or components of either, may perform one or more operations of the methods described herein, such as one or more operations of method 200 of FIG. 2 and/or one or more operations of method 300 of FIG. 3 (described below). For example, one or more operations of method 200 may be implemented, at least in part, in the form of software instructions 160 of FIG. 1, stored on non-transitory, tangible, machine-readable media (e.g., memory 158 of FIG. 1) that when run by one or more processors (e.g., processor 142 of FIG. 1) may cause the one or more processors to perform any of operations 202-212. Other embodiments of method 200 may be performed by other suitable systems or components. In certain embodiments, method 200 begins at step 202 with receiving user criteria associated with a requested operation. As an example, in certain embodiments, the requested operation may request a financial institution to facilitate a loan transaction. For example, the requested datan operation may request the financial institution to provide the user with options for structuring the loan. User criteria associated with such a request may include the user's preferred terms for the loan, such as a total amount of the loan requested by the user, a preferred interest rate, a preferred duration of the loan, and so on. In certain embodiments, the user may submit the request via a user device, and the request may be received by a server or other computing system associated with the financial institution.

Method 200 may proceed to step 204 with obtaining a plurality of segment candidates from a plurality of sources. Any suitable techniques may be used to obtain the segment candidates from the plurality of sources. As an example, certain embodiments may send one or more requests to one or more of the sources. The one or more requests ask the one or more sources to provide their respective segment candidate(s). Certain embodiments may obtain the segment candidates via a website or social media site associated with a source. As another example, certain embodiments may obtain one or more records indicating segment candidates previously used or agreed by the various sources. Records may be stored in memory associated with or accessible to the system performing the method. In certain embodiments, a database engine may be used to retrieve the applicable records. The records may be periodically checked and, if needed, updated, for example, on a weekly or monthly basis and/or based on an indication from a source that a segment candidate has changed. As another example, certain embodiments may obtain the segment candidates based on applying a policy associated with/previously approved by a source. The policy may include inputs such as user criteria and/or user profile information (such as assets, income, credit score, or other financial information associated with the user) and may output segment candidates that may be offered to the user on behalf of that source. Certain embodiments may obtain the segment candidates using multiple techniques, such as any suitable combination of the various example techniques described.

Each source is configured to provide a segment of the requested operation. For example, obtaining a segment candidate from a particular source indicates that the particular source is configured to provide that segment of the requested data processing transaction. In other words, each source is configured to provide a segment of the requested operation that corresponds to a respective segment candidate obtained from said source. As an example, suppose that in step 202 the user sent a request to facilitate a loan in the amount of $100,000. In an embodiment, the plurality of sources includes a first lender A, a second lender B, a third lender C, a fourth lender D, and a fifth lender E. Examples of a lender may include a financial institution, a line-of-business within a financial institution (such line-of-business for a home loan, car loan, credit card, or other type of loan), a peer-to-peer lender, or other suitable lender. In certain embodiments, one of the lenders may be the financial institution that received the request in step 202. The financial institution may participate in the loan or may facilitate a loan between the user and one or more other lenders, depending on the embodiment. Continuing with the example, suppose first lender A provides segment candidate A1, segment candidate A2, and segment candidate A3, second lender B provides segment candidate B1 and segment candidate B2, third lender C provides segment candidate C1, fourth lender D provides segment candidate D1 and segment candidate D2, and fifth lender E provides segment candidate E1, segment candidate E2, and segment candidate E3. Other embodiments may obtain segment candidates from any suitable number of lenders. Each lender may provide any suitable number of segment candidates. Each segment candidate may include a plurality of attributes. Continuing with the loan example, the attributes may indicate terms for a portion of the loan that the particular lender is willing to provide, such as one or more of the following: a type of loan offered (e.g., home loan, car loan, credit card, etc.), an amount of the loan, an interest rate, a monthly payment amount, a duration of the loan, and so on.

Certain segment candidates may by themselves fail to meet the user criteria of step 202. Continuing with the loan example, certain segment candidates may decline to offer the $100,000 total amount requested by the user in step 202. Thus, certain embodiments may recommend a multi-segment structure in order to satisfy the user criteria (e.g., to yield the total loan amount requested by the user). As an example, an embodiment may recommend aggregating segment candidate A1 (such as a $70,000 home loan), segment candidate C1 (such as a $20,000 car loan), and segment candidate E2 (such as a $10,000 credit card loan) in order to yield the requested $100,000. Certain embodiments may determine an optimal combination of segment candidates to recommend to the user, as further described below.

In certain embodiments, method 200 proceeds to step 206 with determining one or more dependencies among the plurality of segment candidates. Each dependency indicates that an attribute of one of the segment candidates impacts an attribute of another of the segment candidates. Continuing with the example of the loan, an attribute of each segment candidate may be an offered interest rate associated with the respective loan. In certain cases, an interest rate may depend on whether the loan is combined with another loan. As an example, segment candidate A1 may offer an interest rate of X % for the loan by itself. However, if segment candidate A1 is combined with segment candidate C1, the interest rate associated with segment candidate A1 may increase to (X %+Y %) or the interest rate associated with segment candidate A1 may decrease to (X %−Y %), for example, depending on the policies of lender A. Thus, at step 206, method 200 may determine a dependency between an attribute of segment candidate A1 (the interest rate) and an attribute of segment candidate C1 (such as a loan type, loan amount, interest rate, lender, and/or other attribute that impacts the interest rate offered for segment candidate A1).

Method 200 proceeds to step 208 with determining a plurality of operation structure candidates for the requested operation. Each operation structure candidate is determined based on aggregating a respective subset of the plurality of segment candidates. As an example, a first operation structure candidate may aggregate a first subset of segment candidates A1, C1, and E2. A second operation structure candidate may aggregate a second subset of segment candidates B2 and E3. A third operation structure candidate may aggregate a third subset of segment candidates A2, A3, D1, and D2. Any suitable number of operation structure candidates may be determined in step 208, and each operation structure candidate may aggregate any suitable number and combination of segment candidates. As an example, in the context of a loan, the number of segment candidates in a particular subset may depend on a loan amount (e.g., one subset may aggregate a smaller number of segment candidates having larger loan amounts and another subset may aggregate a larger number of segment candidates having smaller loan amounts in order for each subset to yield the total loan amount indicated by the user criteria).

In certain embodiments, the plurality of operation structure candidates are determined based at least in part on the one or more dependencies. As an example, method 200 may determine to include operation structure candidates for which there are not any dependencies, operation structure candidates for which the net effect of the one or more dependencies is neutral, and/or operation structure candidates for which the net effect of the one or more dependencies is beneficial, such as an improved/lower interest rate in the example of the loan. Method 200 may determine to exclude operation structure candidates for which the net effect of the one or more dependencies is not beneficial, such as a worse/higher interest rate in the example of the loan.

Continuing with the example above, suppose an embodiment determines a dependency between a first segment candidate (e.g., A1) and a second segment candidate (e.g., C1). The dependency indicates an attribute (e.g., interest rate) of the first segment candidate impacted by an attribute (e.g., loan type, loan amount, interest rate, etc.) of the second segment candidate. Certain embodiments determine whether to include both the first segment candidate (e.g., A1) and the second segment candidate (e.g., C1) in a first subset of the plurality of segment candidates (e.g., the first subset of the plurality of segment candidates aggregated to obtain a first operation structure candidate of the plurality of operation structure candidates). Whether to include both the first segment candidate and the second segment candidate in the first subset depends on the impact of the attribute of the second segment candidate on the attribute of the first segment candidate. For example, if aggregating segment candidates A1 and C1 causes the interest rate to improve, method 200 may include segment candidates A1 and C1 in the first subset. If, however, aggregating segment candidates A1 and C1 causes the interest rate to get worse, method 200 may determine not to include A1 and C1 in the first subset. Instead, method 200 may determine to aggregate segment candidates for which the dependencies are neutral or beneficial. For example, the dependencies may indicate that segment candidate A1 may be better suited to be aggregated with a different segment candidate, such as segment candidate A2, segment candidate B1, and/or another suitable segment candidate.

In certain embodiments, method 200 avoids aggregating any of the segment candidates for which one or more dependency rules indicate said segment candidates cannot be aggregated. In certain embodiments, one or more dependency rules may be based on policies of the respective sources. As an example, suppose lender A indicates that segment candidate A1 can only be combined with other segment candidates that satisfy certain criteria (such as loan amount within a certain range, interest rate within a certain range, loan duration within a certain range, collateral of a particular type, and/or other criteria). Method 200 may avoid aggregating segment candidate A1 with any of the other segment candidates that fail to satisfy the criteria indicated in the dependency rule.

In certain embodiments, method 200 may be configured to use machine learning to optimize how to determine the segment candidates to include in a subset that gets aggregated to yield an operation structure candidate. For example, the machine learning may learn which dependencies yield improvements and may determine to include segment candidates with such dependencies in an operation structure candidate.

Method 200 proceeds to step 210 with determining a priority associated with each operation structure candidate. The priority is determined based at least in part on the user criteria received in step 202. Continuing with the example, suppose a first operation structure candidate and a second operation structure candidate both satisfy the user's preferred loan amount and loan duration. Further suppose that the first operation structure candidate also satisfies the user's preferred interest rate, but the second operation structure candidate yields an interest rate higher than the user prefers. Method 200 may assign higher/better priority to the first operation structure candidate and lower/worse priority to the second operation structure candidate.

The priority determined in step 210 may further be based on prioritization rules. As an example in the context of a loan, a prioritization rule may indicate to increase or decrease the priority based on the total number of lenders involved in a particular operation structure candidate. As another example, a prioritization rule may indicate to increase or decrease the priority based on a proportion of the total loan amount allocated to a particular type of collateral. As another example, a prioritization rule may indicate to increase or decrease priority depending on the overall interest rate. For example, suppose the user criteria indicates that the user prefers an interest rate of 5% or better. Based on the user criteria, a first operation structure candidate with an interest rate of 2% and a second operation structure candidate with an interest rate of 3% may both be prioritized over operation structure candidates with interest rates above 5%. Further, based on the prioritization rule, the first operation structure candidate may be prioritized ahead of the second operation structure candidate because it has a better interest rate.

In certain embodiments, one or more of the prioritization rules may be based on machine learning. For example, machine learning may be used to determine a pattern associated with the selection of prior operation structure candidates by a plurality of prior users. The pattern may indicate user preferences associated with aggregating prior transaction segment candidates. The prioritization rules may be adapted based on the pattern. Adapting the prioritization rules may include adding, deleting, or modifying a prioritization rule. As an example, machine learning may determine a pattern based on observing loan offerings made to prior users that requested loans based on user criteria similar to that of the current user and further observing which of the loan offerings the prior users ultimately accepted. For example, if the pattern indicates that prior users having similar user criteria as the current user typically prefer to structure their loans by combining a relatively large home loan with a relatively small credit card loan, the prioritization rules may be adapted to prioritize such structures. The machine learning may continue to update the pattern and adapt the rules as users continue to select operation structures. In this manner, the prioritization rules may be kept up-to-date based on evolving user preferences or trends and may reflect common preferences observed for a wide range of users, which may improve the speed and accuracy with which method 200 prioritizes the operation structure candidates.

Method 200 proceeds to step 212 with communicating an output to the user. The output indicates one or more of the operation structure candidates for the requested operation. The output is based on the priority. For example, certain embodiments may recommend the N highest priority operation structure candidates as options for the user to choose from (where N is a number, such as 1, 2, 3, or other suitable number). Certain embodiments may output all of the operation structure candidates and may order/rank the operation structure candidates by priority. Certain embodiments may include a priority indicator for each operation structure candidate presented to the user (such as a score, a ranking, a tier, a color-code, or some other indicator of priority). The priority indicator may help the user decide which of the operation structure candidates to choose.

In certain embodiments, the output communicated in step 212 excludes each operation structure candidate for which said operation structure candidate fails to satisfy an attribute of the user criteria received in step 202 within a predetermined threshold. The threshold may be configured to allow some margin in order to present the user with options that the user might not have been aware of, but may want to consider. As an example, method 200 may include an operation structure candidate with a slightly different interest rate and loan duration than the user originally requested based on the operation structure candidate resulting in a lower monthly payment that may be of interest to the user. However, if one or more attributes of a particular operation structure candidate are significantly different than the user criteria (e.g., not within the pre-determined threshold), the particular operation structure candidate may be excluded. Suppose the user criteria specifies an interest rate less than or equal to 5% and suppose the pre-determined threshold is set to 1%. In this example, the user criteria together with the pre-determined threshold allows for an interest rate up to 6%. Thus, the output communicated in step 212 may include an operation structure candidate having an interest rate of 5.5% because this interest rate falls within the pre-determined threshold relative to the user criteria. The output communicated in step 212 may exclude an operation structure candidate having an interest rate of 7% because this interest rate falls outside of the pre-determined threshold relative to the user criteria.

Certain embodiments determine whether to output any of the operation structure candidates based on comparing the plurality of operation structure candidates to one or more individual operation candidates. An individual operation candidate may allow for completing the operation by itself (without having to aggregate any segment candidates). For example, if the user requests a loan in the amount of $100,000, an individual operation candidate may be a single loan in the amount of $100,000. If the single loan has better terms than the various options for the structured transaction (e.g., the single loan has a better interest rate, monthly payment, loan duration, etc.), method 200 may recommend that the user select the single loan instead of aggregating a number of smaller loans according to a structured operation. The comparison of the operation structure candidates to the individual operation candidates may be based on user criteria and/or prioritization rules, for example.

Example Method for Facilitating a Multi-Segment Operation

Figure 3:
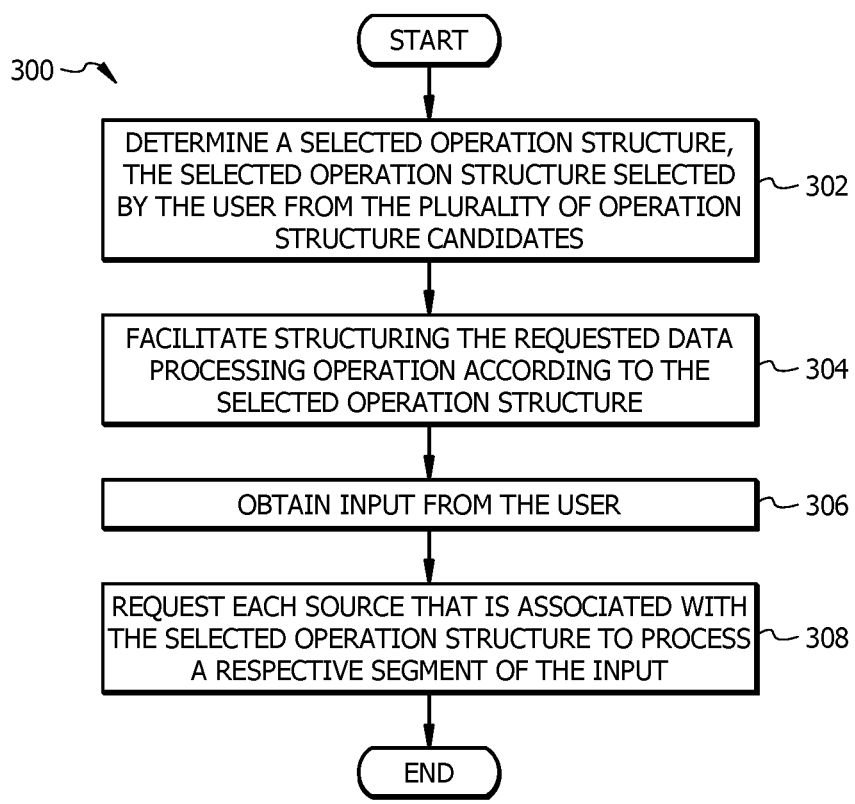
FIG. 3 illustrates an example flowchart of a method for facilitating a multi-segment operation.

FIG. 3 illustrates an example flowchart of a method 300 for facilitating a multi-segment operation. Modifications, additions, or omissions may be made to method 300. Method 300 may include more, fewer, or other steps. For example, steps may be performed in parallel or in any suitable order. In certain embodiments, system 100, server 140, or components of either, may perform one or more operations of the methods described herein, such as one or more operations of method 200 of FIG. 2 (described above) and/or one or more operations of method 300 of FIG. 3. For example, one or more operations of method 300 may be implemented, at least in part, in the form of software instructions 160 of FIG. 1, stored on non-transitory, tangible, machine-readable media (e.g., memory 158 of FIG. 1) that when run by one or more processors (e.g., processor 142 of FIG. 1) may cause the one or more processors to perform any of operations 302-308. Other embodiments of method 300 may be performed by other suitable systems or components.

In certain embodiments, method 300 may begin at step 302 with determining a selected operation structure. The selected operation structure is selected by the user from a plurality of operation structure candidates. For example, the plurality of operation structure candidates may be presented to the user as the output described with respect to step 212 of FIG. 2, and the user may select one of the operation structure candidates based on the user's preferences. Method 300 may then proceed to step 304 to facilitate structuring the requested operation according to the selected operation structure. As an example, suppose the requested operation requests the system to facilitate a loan. Further suppose that the selected operation structure involves aggregating multiple smaller loans from multiple lenders. Step 304 may involve performing any necessary checks and obtaining any necessary approvals associated with applying for and funding the multiple smaller loans.

In certain embodiments, method 300 includes obtaining input for the user at step 306 and requesting each source that is associated with the selected operation structure to process a respective segment of the input at step 308. For example, suppose the selected operation structure comprises obtaining a loan from lender A for a first portion of a total amount and a loan from lender B for a second portion of the total amount. The input from the user in step 306 may comprise an electronic payment for the amount owed during the current payment period. The request in step 308 may request lender A to process a portion of the payment associated with the loan from lender A and may request lender B to process a portion of the payment associated with the loan from lender B.

As described above, certain embodiments of the present disclosure may be implemented in the context of a loan. Often when a customer needs to take a loan, such as a car loan, home loan, or loan for the purchase of land, the customer typically needs to research many different banks/lenders to compare loan terms. This is particularly difficult when the loan transaction includes multiple prongs, such as a car loan in conjunction with a mortgage loan or a personal loan. If the customer contacts a single bank to support these loans, the customer may not be able to easily compare loan terms (interest rate, etc.) offered by multiple banks. Comparing loan terms would require the customer to go to multiple sources for the full amount of the loan. This process fails to inform the customer how one aspect of the loan may impact other aspects of the loan. As an example, the customer may be unaware that combining a home loan portion from a first bank with a car loan portion from a second bank may reduce the interest rate compared to obtaining the full amount of the loan from one of the banks. Certain embodiments of the present disclosure may provide a solution to this problem.

Certain embodiments aggregate loan data from multiple sources and present a comprehensive set of loan terms for comparison by the customer. Certain embodiments account for any dependencies of one loan transaction on another loan transaction. For example, machine learning may be used to account for the dependencies and recommend an optimal approach to structuring a multi-aspect (e.g., multi-prong) loan.

In one use case, a system may be configured to compare loan terms across the industry and present them to the customer in a comprehensive fashion. For example, a system associated with a first potential lender (such as a bank or other financial institution) may receive a request for a particular loan sought by a customer. The system associated with the first potential lender may determine the first potential lender's proposed terms for the loan and/or may gather data from all other potential lenders (e.g., banks, credit unions, other financial institutions, peer-to-peer lenders, etc.). The system uses the loan data from the various lenders to determine the loan terms that would apply to the particular loan. The system presents those loan terms to the customer so that the customer can easily perform a comparison. The system may use machine learning to optimize multiple terms for a particularly complex loan transaction. The system may improve the speed and accuracy with which the customer obtains information about the loan terms of various loans available to the customer. For example, the customer need not perform the time-consuming and potentially error-prone task of calling each lender individually and then manually comparing the offerings of the various lenders.

In some cases, various loans may be structured to improve the overall loan terms for the customer. As an example, the customer may be able to obtain an overall lower interest rate by structuring multiple smaller loans from several lenders instead of one large loan from a single lender. For example, the customer may be able to obtain a 5% overall interest rate on $100,000 in small loans (e.g., $35,000 personal loan from a first lender, $20,000 car loan from a second lender, and $45,000 home loan from a third lender) compared to a 10% overall interest rate if the customer were to take out a single loan in the amount of $100,000. As another example, the customer may be able to obtain a better overall interest rate based on the duration of the loan (e.g., a 2-year car loan may have a better interest rate than a 3-year car loan). Certain embodiments may recommend structuring one or more loans in a manner that optimizes the loan terms. Additionally, certain embodiments may recommend other actions that the customer may take in order to optimize the loan terms. As an example, if opening a checking account with the first lender would improve the loan terms offered by the first lender, certain embodiments may recommend that the customer opens a checking account with the first lender. In this manner, certain embodiments may inform the customer about options that the customer might not otherwise be aware of.

In certain embodiments, the system may provide search and comparison functionality, and the customer may then take next steps with the lenders selected by the customer. In other embodiments, the various lenders may have contracts in place that authorize the system to issue the loans on behalf of the lenders. For example, in certain embodiments, the system may provide a place of syndication for a set of loans funded by multiple lenders. The system may facilitate setting up loans with multiple lenders and/or making payments to multiple vendors. For example, in certain embodiments, the customer receives only one charge per payment period for the set of loans. The charge may be facilitated by the system, and the system may distribute to each lender a respective portion of the payment received from the customer.

In certain embodiments, the system may facilitate collaboration among lenders. For example, the system may obtain a credit check associated with the customer and may share the results of the credit check with other lenders.

In one use case, a customer may try to secure multiple loans at the same time or a particular loan may involve multiple prongs. One of the loans (or prongs) may affect another loan (or prong). For example, a first loan may impact the customer's credit score used to determine the interest rate of a second loan. In certain embodiments, the system analyzes the loan terms offered by different lenders and optimizes the structure of the loan taking such dependencies into consideration. For example, the system may include a machine learning engine configured to play out a hypothetical impact that one loan will have on another loan, or the impact that one aspect of a complex loan will have on other aspects of the complex loan. The system can present the final scenario to the customer so that the customer can choose the best option and lender(s). In certain embodiments, the machine learning engine may use one or more patterns to analyze the impact, such as patterns based on consumer behavior or relevant subsets of existing loans. Over time, updated consumer behavior information or loan information may be fed back to the machine learning engine in order to update the patterns or generate new patterns.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U. S.C. § 112(f) as it exists on the date of filing hereof unless the words "means for" or "step for" are explicitly used in the particular claim.

The invention claimed is:

1. A system for structuring operations, comprising:
a memory configured to store a trained machine learning module, prioritization rules, wherein the prioritization rules facilitate structuring the operations; and
a processor, operably coupled with the memory, and configured to:
receive a first request associated with a requested operation, wherein the requested operation is associated with a task to be performed and comprises multiple segments, and wherein the first request comprises user criteria associated with the requested operation;
retrieve a plurality of segment candidates from a plurality of web sources, each of the web source is configured to provide a segment of the requested operation that corresponds to a respective segment candidate obtained from the said web source, wherein each segment of the requested operation can be used to fulfill at least a portion of the task to be performed;
in response to retrieving the segment candidates, store the segment candidates in the memory;
detect, by utilizing the trained machine learning module, a pattern associated with selection of prior operation structure candidates by a plurality of prior users;
update, by utilizing the trained machine learning module, the prioritization rules and dependency rules based on the detected pattern, wherein the dependency rules indicate whether a respective subset of the plurality of segment candidates can be aggregated;
determine, by utilizing the trained machine learning module, a plurality of operation structure candidates configured to perform the task associated with the requested operation, wherein each operation structure candidate is determined based on the trained machine learning module utilizing the updated dependency rules to aggregate the respective subset of the plurality of segment candidates;
determine, for each operation structure candidate, a priority associated with said operation structure candidate, the priority determined based at least in part on the user criteria and the updated prioritization rules, wherein a highest priority is associated with a first operation candidate;
communicate an output indicating the first operation structure candidate associated with the highest priority, wherein the first operation structure candidate is configured to perform the task associated with the requested operation;
receive a second request to retrieve the segment candidates from the plurality of web sources; and
in response to receiving the second request, retrieve the segment candidates stored in the memory.

2. The system of claim 1, the processor is further configured to:
- determine one or more dependencies among the plurality of segment candidates, each dependency indicating that an attribute of one of the segment candidates impacts an attribute of another of the segment candidates; and
- determine the plurality of operation structure candidates based at least in part on the one or more dependencies.

3. The system of claim 1, the processor is further configured to:
- determine a dependency between a first segment candidate and a second segment candidate, the dependency indicating an attribute of the first segment candidate impacted by an attribute of the second segment candidate; and
- determine whether to include both the first segment candidate and the second segment candidate in a first subset of the plurality of segment candidates, the first subset of the plurality of segment candidates aggregated to obtain the first operation structure candidate of the plurality of operation structure candidates;
- wherein whether to include both the first segment candidate and the second segment candidate in the first subset depends on the impact of the attribute of the second segment candidate on the attribute of the first segment candidate.

4. The system of claim 1, wherein to determine the plurality of operation structure candidates, the processor is further configured to avoid aggregating any of the segment candidates for which the dependency rules indicate said segment candidates cannot be aggregated.

5. The system of claim 1, the processor further configured to:
- in response to detecting the pattern associated with selection of prior operation structure candidates, adapt the prioritization rules based on the pattern, wherein the adapting of the prioritization rules comprises adding, deleting, or modifying the prioritization rules.

6. The system of claim 1, the processor further configured to determine whether to output a second operation structure candidate based on comparing the plurality of operation structure candidates to one or more individual operation candidates.

7. The system of claim 1, wherein the output excludes a second operation structure candidate that fails to satisfy an attribute of the user criteria within a pre-determined threshold.

8. The system of claim 1, wherein the processor is further configured to:
- determine a second operation structure candidate, wherein the second operation structure candidate is selected by a user from the plurality of operation structure candidates; and
- facilitate structuring the requested operation according to the second operation structure candidate.

9. The system of claim 8, wherein the processor is further configured to:
- obtain input from the user; and
- request a first web source that is associated with the second operation structure candidate to process a respective segment of the input.

10. A method for structuring operations, comprising:
- receiving a first request associated with a requested operation, wherein the requested operation is associated with a task to be performed and comprises multiple segments, and wherein the first request comprises user criteria associated with the requested operation;
- retrieving a plurality of segment candidates from a plurality of web sources, each of the web source is configured to provide a segment of the requested operation that corresponds to a respective segment candidate obtained from the said web source, wherein each segment of the requested operation can be used to fulfill at least a portion of the task to be performed;
- in response to retrieving the segment candidates, storing the segment candidates in a memory;
- detecting, by utilizing a trained machine learning module, a pattern associated with selection of prior operation structure candidates by a plurality of prior users;
- updating, by utilizing the trained machine learning module, prioritization rules and dependency rules based on the detected pattern, wherein the dependency rules indicate whether a respective subset of the plurality of segment candidates can be aggregated;
- determining, by utilizing the trained machine learning module, a plurality of operation structure candidates configured to perform the task associated with the requested operation, wherein each operation structure candidate is determined based on the trained machine learning module utilizing the updated dependency rules to aggregate the respective subset of the plurality of segment candidates;
- determine, for each operation structure candidate, a priority associated with said operation structure candidate, the priority determined based at least in part on the user criteria and the updated prioritization rules, wherein a highest priority is associated with a first operation candidate;
- communicate an output indicating the first operation structure candidate candidates associated with the highest priority, wherein the first operation structure candidate is configured to perform the task associated with the requested operation;
- receiving a second request to retrieve the segment candidates from the plurality of web sources; and
- in response to receiving the second request, retrieving the segment candidates stored in the memory.

11. The method of claim 10, further comprising:
- determining one or more dependencies among the plurality of segment candidates, each dependency indicating that an attribute of one of the segment candidates impacts an attribute of another of the segment candidates; and
- determining the plurality of operation structure candidates based at least in part on the one or more dependencies.

12. The method of claim 10, further comprising:
- determining a dependency between a first segment candidate and a second segment candidate, the dependency indicating an attribute of the first segment candidate impacted by an attribute of the second segment candidate; and
- determining whether to include both the first segment candidate and the second segment candidate in a first subset of the plurality of segment candidates, the first subset of the plurality of segment candidates aggregated to obtain the first operation structure candidate of the plurality of operation structure candidates;
- wherein whether to include both the first segment candidate and the second segment candidate in the first subset depends on the impact of the attribute of the second segment candidate on the attribute of the first segment candidate.

13. The method of claim 10, further comprising:
in response to detecting the pattern associated with selection of prior operation structure candidates, adapting the prioritization rules based on the pattern, wherein the adapting of the prioritization rules comprises adding, deleting, or modifying the prioritization rules.

14. The method of claim 10, further comprising:
determining a second operation structure candidate, wherein the second operation structure candidate is selected by a user from the plurality of operation structure candidates; and
facilitating structuring the requested operation according to the second operation structure candidate.

15. The method of claim 14, further comprising:
obtaining input from the user; and
requesting a first web source that is associated with the second operation structure candidate to process a respective segment of the input.

16. A non-transitory computer-readable medium storing instructions that when executed by a processor cause the processor to:
receive a first request associated with a requested operation, wherein the requested operation is associated with a task to be performed and comprises multiple segments, and wherein the first request comprises user criteria associated with the requested operation;
retrieve a plurality of segment candidates from a plurality of web sources, each of the web source is configured to provide a segment of the requested operation that corresponds to a respective segment candidate obtained from the said web source, wherein each segment of the requested operation can be used to fulfill at least a portion of the task to be performed;
in response to retrieving the segment candidates, store the segment candidates in a memory;
detect, by utilizing a trained machine learning module, a pattern associated with selection of prior operation structure candidates by a plurality of prior users;
update, by utilizing the trained machine learning module, prioritization rules and dependency rules based on the detected pattern, wherein the dependency rules indicate whether a respective subset of the plurality of segment candidates can be aggregated;
determine, by utilizing the trained machine learning module, a plurality of operation structure candidates configured to perform the task associated with the requested operation, wherein each operation structure candidate is determined based on the trained machine learning module utilizing the updated dependency rules to aggregate the respective subset of the plurality of segment candidates;
determine, for each operation structure candidate, a priority associated with said operation structure candidate, the priority determined based at least in part on the user criteria and the updated prioritization rules, wherein a highest priority is associated with a first operation candidate;
communicate an output indicating the first operation structure candidate associated with the highest priority, wherein the first operation structure candidate is configured to perform the task associated with the requested operation;
receive a second request to retrieve the segment candidates from the plurality of web sources; and
in response to receiving the second request, retrieve the segment candidates stored in the memory.

17. The non-transitory computer-readable medium of claim 16, wherein the instructions, when executed by the processor, further cause the processor to:
determine one or more dependencies among the plurality of segment candidates, each dependency indicating that an attribute of one of the segment candidates impacts an attribute of another of the segment candidates; and
determine the plurality of operation structure candidates based at least in part on the one or more dependencies.

18. The non-transitory computer-readable medium of claim 16, wherein the instructions, when executed by the processor, further cause the processor to:
determine a dependency between a first segment candidate and a second segment candidate, the dependency indicating an attribute of the first segment candidate impacted by an attribute of the second segment candidate; and
determine whether to include both the first segment candidate and the second segment candidate in a first subset of the plurality of segment candidates, the first subset of the plurality of segment candidates aggregated to obtain the first operation structure candidate of the plurality of operation structure candidates;
wherein whether to include both the first segment candidate and the second segment candidate in the first subset depends on the impact of the attribute of the second segment candidate on the attribute of the first segment candidate.

19. The non-transitory computer-readable medium of claim 16, wherein the instructions, when executed by the processor, further cause the processor to:
in response to detecting the pattern associated with selection of prior operation structure candidates, adapt the prioritization rules based on the pattern, wherein the adapting of the prioritization rules comprises adding, deleting, or modifying the prioritization rules.

20. The non-transitory computer-readable medium of claim 16, wherein the instructions, when executed by the processor, further cause the processor to:
determine a second operation structure candidate, wherein the second operation structure candidate is selected by a user from the plurality of operation structure candidates; and
facilitate structuring the requested operation according to the second operation structure candidate.

\* \* \* \* \*